United States Patent [19]

Moulet

[11] 3,913,882

[45] Oct. 21, 1975

[54] DEVICE FOR CONTROLLING THE FLOW OF FLUID THROUGH FLEXIBLE TUBES

[75] Inventor: Camille Moulet, Cannes, France

[73] Assignee: Crinospital S.p.A., Palazzo Pignano (Cremona), Italy

[22] Filed: Oct. 23, 1973

[21] Appl. No.: 408,924

[30] Foreign Application Priority Data
Oct. 31, 1972  Italy.................................. 31157/72

[52] U.S. Cl. .................................. 251/9; 24/132 R
[51] Int. Cl.² ........................................ F16K 7/06
[58] Field of Search.......................... 251/4, 6–10; 128/214 R, 214 C; 24/115 G, 132 R, 132 AB

[56] References Cited
UNITED STATES PATENTS

| 1,994,098 | 3/1935 | Fulton...................................... 251/9 |
| 3,034,504 | 5/1962 | Winsor et al. ....................... 251/9 X |
| 3,335,753 | 8/1967 | Kiser..................................... 251/9 X |

FOREIGN PATENTS OR APPLICATIONS

| 858,911 | 5/1940 | France................................... 251/9 |
| 1,206,243 | 8/1959 | France................................... 251/9 |

Primary Examiner—Martin P. Schwadron
Assistant Examiner—Richard Gerard
Attorney, Agent, or Firm—Finnegan, Henderson, Farabow & Garrett

[57] ABSTRACT

A device for controlling the flow of fluid through a resilient, flexible tube for particular use in single use surgical apparatus, having a housing surrounding the tube, an aperture in the side wall of the housing, and a manually or mechanically actuated lever that extends through the aperture in the housing and when actuated compresses the tube at a location adjacent to and in a direction toward the aperture in the side wall of the housing to provide an exact and variable adjustment of the flow rate of liquids through the tube.

2 Claims, 2 Drawing Figures

DEVICE FOR CONTROLLING THE FLOW OF FLUID THROUGH FLEXIBLE TUBES

BACKGROUND OF THE INVENTION

The present invention relates to a microcontrol device for fluid flow through flexible tubes, particularly for controlling the flow of liquids in infusion or transfusion apparatus, which can be either manually or mechanically actuated.

The microcontrol device of this invention is mainly designed for use as an integral part of a disposable, sterile and apyrogenetic assembly, which is supplied protected and ready for service under the usual name of an infusion or transfusion set. Such assemblies known in the art, are to be used just once and are disposed of after use.

The sterile sets already known for infusions-transfusions comprise generally a needle that is to be driven through the cap of the container storing the liquid to be infused, the needle being connected, through a flexible tube, to a drip chamber having a second flexible tube extendingd therefrom whose end is connected to the injection needle. To said flexible tube, at an intermediate location between the drip chamber and the needle, a clamp is placed to control the flow rate of the infusion liquid. With a clamp, or similar tube intercepting means, presently in use it is hard to control the flowrate which is likely to change in the course of the procedure. In fact said clamps or similar means, while being closed, tightly press the flexible tube between two hard surfaces so that the tube walls become flattened and warped, while two very sharp bights are simultaneously formed, which tend to buckle the tube wall in a transverse direction. When the clamp is then released to a large or lesser extent, to allow for the passage of a controlled flow of liquid, the original setting tends to modify since the more or less resilient material of the tube walls cannot adjust at once to the new operating conditions, due to the high stress it has been subjected to, so that the effective cross-sectional area of the tube may show slight variations, in the long run, directly affecting the rate of flow of the liquid.

SUMMARY OF THE INVENTION

The microcontrol device according to this invention is to replace the interceptor clamps or similar devices now in use, in order to secure a more precise setting of the liquid flowrate, which is very important when, for medical or surgical purposes, the use of minimal and controlled quantities of particularly active or dangerous products is prescribed.

Preferably the microcontrol device according to this invention can be manually operated for small, constant flowrates, such as for normal infusions, or mechanically actuated when there is a need for continuously adjusting the liquid flow to other parameters variable with time.

It should obviously be noted that, particularly for mechanical actuation, the effective control cross section of the tube must adjust most rapidly to each new operating condition required.

This object is readily and effectively fulfilled by the microcontrol device according to this invention, which eliminates all the drawbacks due to bilateral compression of the supply tube.

DETAILED DESCRIPTION OF THE PREFERRED EMBODIMENT

Figure 1:
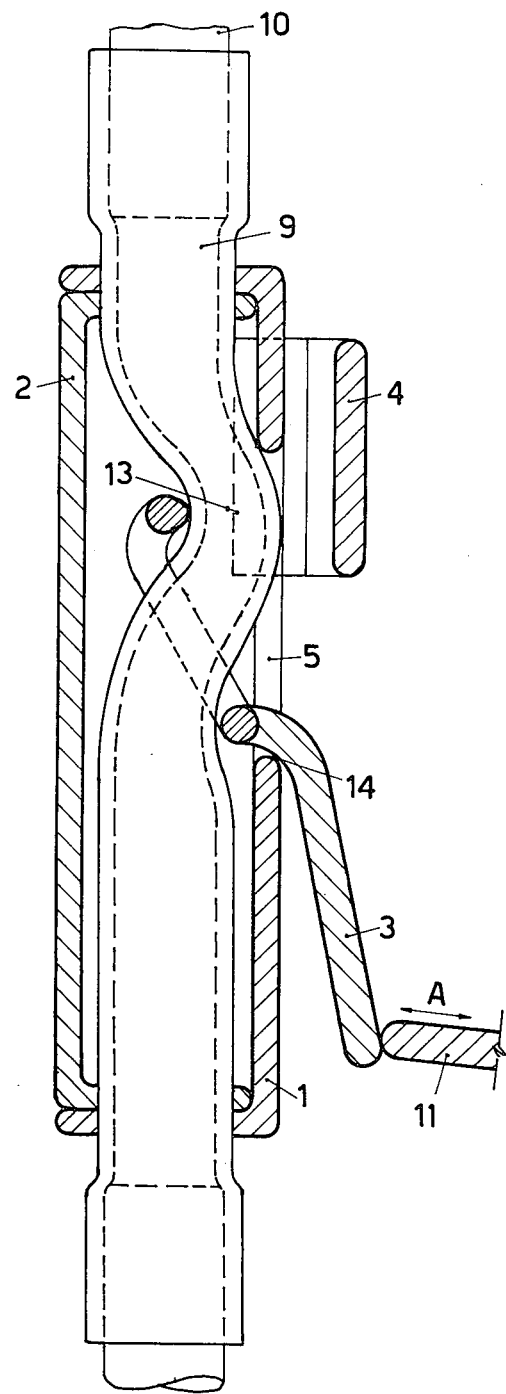
Figure 2:
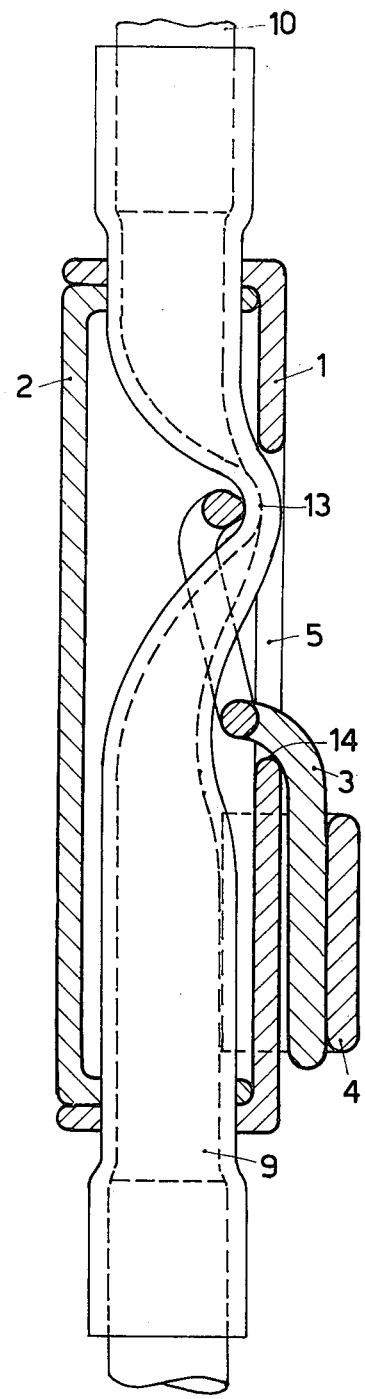

An embodiment of the microcontrol device for fluid flow according to this invention will now be described with more details but without any meaning of limitation, referring to the annexed drawings, in which:

FIG. 1 is a partly sectional side view taken on a longitudinal sectional plane running from front to back of the device of this invention, mechanically coupled for operation to a suitable control device; and FIG. 2 is a view on the same plane of FIG. 1, showing the microcontrol device in a manually operated condition.

Referring to the drawings, a device is shown having a hollow rectangular body, for through passage of the flexible tube 9, consisting of a pair of members 1 and 2, mutually interconnected. The front part of the device consisting of member 1 has an opening 5 which communicates with the inside of the body and accommodates part of a lever 3 for controlling the liquid flowrate by compression on the tube walls at location 13. Lever 3 is provided at its upper portion located within the device with a looped portion encircling the periphery of tube 9. In operation, lever 3 can be manually or mechanically operated by pressing the outer arm, which transmits a pressure, with the fulcrum at location 14, to the inner upper end of the looped portion of said lever and therefore directly on tube 9 which is deformably pushed towards opening 5. Once the desired control has been set, it is possible to keep lever 3 in position, during manual operation, by slider 4 that reciprocates up and down along guide ribs extending laterally from the front side of member 1.

FIG. 1 shows the condition when slider 4 is not actuated and lever 3, naturally biased by the walls of tube 9, is in its idle position. Lever 3 controlled by push rod 11, which is in turn connected to an automatic regulating device subjecting it to a linear reciprocating movement in the direction of arrow A.

It should be noted that push rod 11, according to its stroke, can take any of the intermediate positions between the condition corresponding to the idle position of lever 3, i.e., maximum opening at location 13, and the condition corresponding to maximum displacement of the lever arm i.e., maximum compression of the tube and accordingly complete interception of flow at location 13.

FIG. 2 shows the condition when slider 4, is actuated to hold the lever, acting on the tube walls through opening 5 in maximum compression, so that.the liquid flow at location 13 is intercepted.

The deformable tube 9 used in connection with the microcontrol device according to this invention must comprise a highly resilient material, as for example a suitable plastic, though non cured rubber is preferred. Said tube may further be of circular or preferably elliptical cross-section, so that its deformation is easier at the minor axis of the ellipse.

The microcontrol device according to this invention may consist of any suitable material, such as a metal or preferably a suitably stiff plastic material. Beyond said medical-surgical applications, such as transfusions, infusions, perfusions, phleboclysis, hypoderma toclysis, the device according to this invention may also be used for laboratory or chemical applications, where a precise metering of liquid flow is needed, such as for example certain types of chemical reactions.

The embodiment here disclosed and shown in the annexed drawings is just exemplary and without any intent to limit the invention.

Additions and/or modifications can be made by those skilled in the art without departing from the scope of the invention.

What is claimed is:

1. In a device for controlling the flow of fluid through a flexible tube having a longitudinally extending hollow body with longitudinally opposed apertured walls for accommodating the tube, the body having a transverse apertured wall and tube engaging means operable through the aperture of said transverse wall for compressing a portion of the tube and thereby controlling the flow of fluid through the tube, the improvement wherein said tube engaging means comprises a lever extending through the aperture of the transverse wall and mounted for pivotable movement with respect to said aperture, said lever having an arm portion located outside of the body for contact by the operator and a looped portion located within the body, said looped portion encircling the periphery of the tube within the body and having a section on the far side of the tube from the lever arm portion lying opposite the aperture in the transverse wall, so that when pressure is applied to the arm portion of the lever to pivot it towards the body, the said section of the looped portion compresses the tube at a location adjacent to and in a single direction toward the transverse aperture.

2. The device of claim 1, including arm retaining means slidably mounted on the body for holding the lever in a fixed position.

* * * * *